Oct. 11, 1938.  J. EGGERT ET AL  2,132,893
PHOTOGRAPHIC PRINTING
Filed July 17, 1935  3 Sheets-Sheet 1

Inventors:
John Eggert,
Gerd Heymer,
By Attorneys
Potter, Prince & Scheffler.

Oct. 11, 1938.  J. EGGERT ET AL  2,132,893
PHOTOGRAPHIC PRINTING
Filed July 17, 1935   3 Sheets-Sheet 2
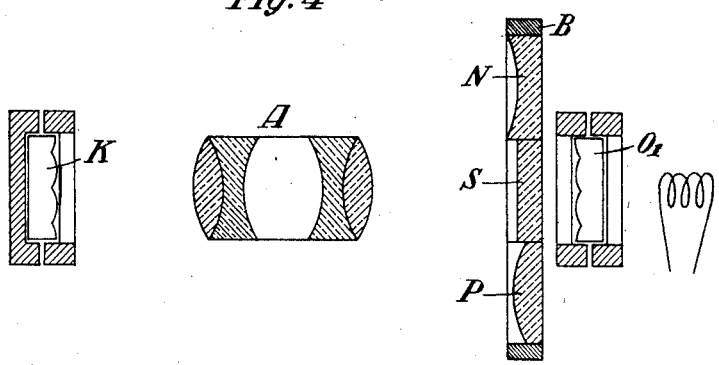
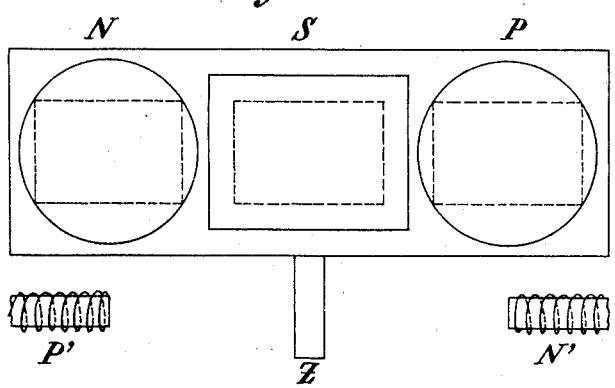
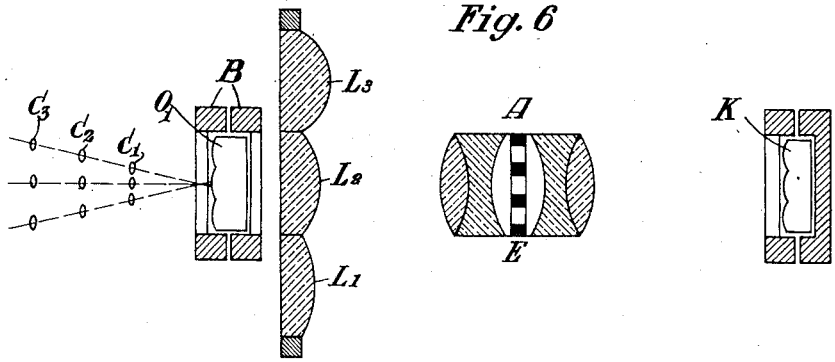

Oct. 11, 1938.   J. EGGERT ET AL   2,132,893
PHOTOGRAPHIC PRINTING
Filed July 17, 1935   3 Sheets-Sheet 3
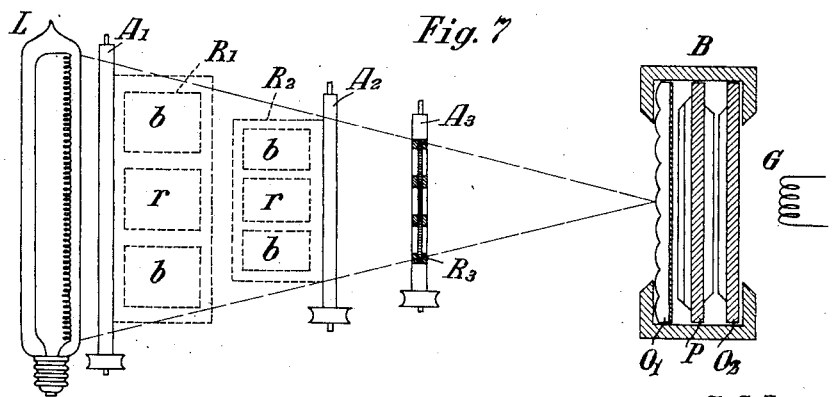
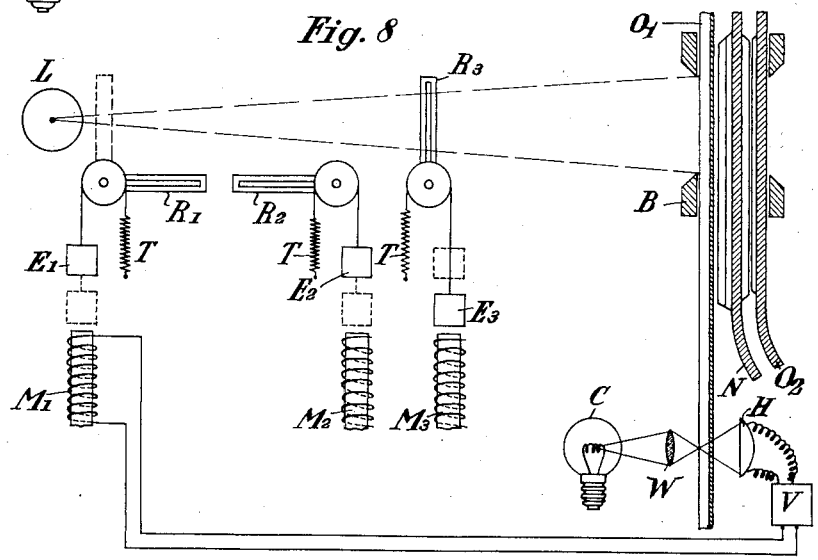
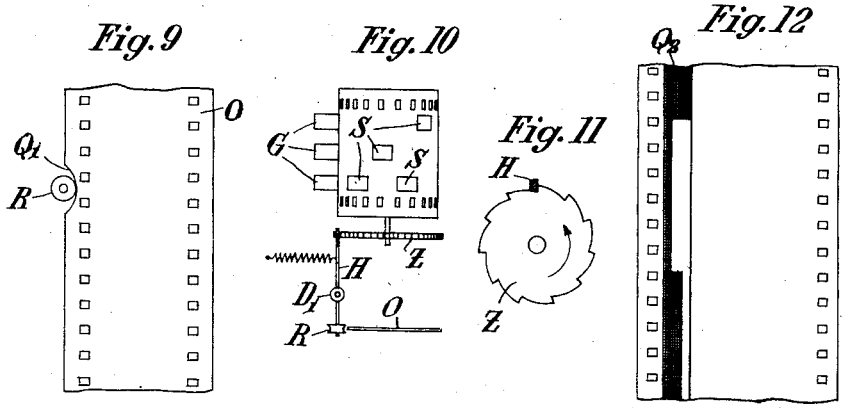
Inventors:
John Eggert,
Gerd Heymer,
By Attorneys
Potter, Pierce & Scheffler Patented Oct. 11, 1938

2,132,893

UNITED STATES PATENT OFFICE 2,132,893

PHOTOGRAPHIC PRINTING

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application July 17, 1935, Serial No. 31,924
In Germany July 24, 1934

4 Claims. (Cl. 88—24)

Our present invention relates to photographic printing and more particularly to printing on and/or from lenticular films.

Figure 1:
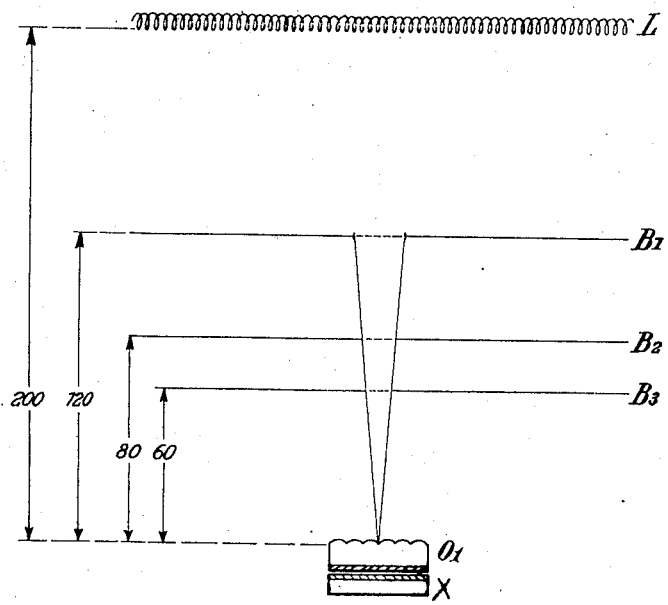
Figure 2:
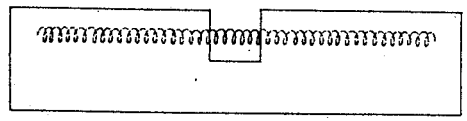
Figure 3:
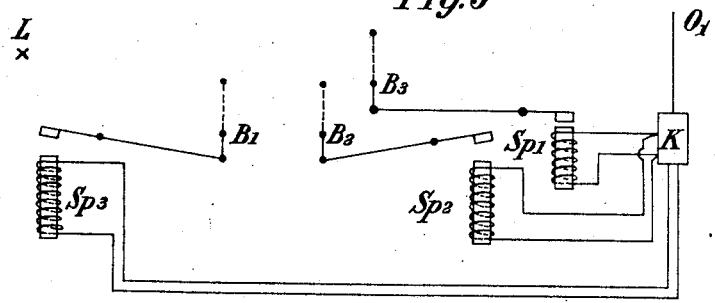

One of its objects is to provide an improved process of this kind according to which photographs taken with different focal length lenses can be continuously printed to a print which can be projected with always the same focal length. Another object is an apparatus for printing according to this invention. Further objects will be seen from the detailed specification following hereafter. Reference is made to the accompanying drawings in which:

Fig. 1 shows the illumination of a lenticular film to be printed and taken with different focal lengths, Fig. 2 shows a source of light masked by a diaphragm for printing according to this invention, Fig. 3 shows diagrammatically an electrical device for putting the diaphragm in and out of position in the printing operation, Fig. 4 shows an arrangement for optically printing a lenticular film on another lenticular film with the lenticular elements facing each other in accordance with the invention, Fig. 5 shows a slide provided with optical elements for compensating the filter distance in printing with the arrangement shown in Fig. 4, Fig. 6 shows an arrangement for optically printing a lenticular film on another lenticular film with the lenticular elements of the print facing the smooth side of the original film according to this invention, Fig. 7 shows an arrangement for printing color photographs taken on a bi-pack consisting of a lenticular film and a smooth film on a smooth film provided with several emulsion layers, Fig. 8 shows an arrangement for changing the filter distance when printing a film-part taken with another focal length, Figs. 9, 10 and 12 show films provided with marks for the purpose of this invention, and Figs. 10 and 11 show a device for changing the filter distance when using a film provided with marks as shown in Fig. 8.

In the reproduction of lenticular films the distance of the filter from the film plays an important part. Characteristic of a lenticular color-record film is the position of the plane in which intersect the traces of the rays passing through the centers of the images of the multi-color exposure filter behind each lenticular element and through the centers of the surfaces of the coordinate lenticular elements. In this plane (whose distance from the film is hereinafter referred to as the "filter distance") must be placed the projection filter for correct projection of the film. The position of this plane may be varied by optical devices, for example by interposition of an auxiliary lens, or mechanically, for example by curving the film.

In the cinematograph industry, it is now usual in exposing the film to use objectives with various focal lengths, according to the effect desired. In general, focal lengths of 35, 50 and 70 mm. are used, and these for special purposes can be supplemented by objectives of extremely long or extremely short focal length. For the projection it is necessary that the film to be exhibited should have only one individual filter distance. Originals, therefore, which were produced with different focal lengths are copied by a process which permits variation of the filter distance. In copying lenticular film on a like film with the lenticular elements facing each other, variation of the filter distances may be produced on the copy by curving the original film or the copy film, as described, for example, in British specification No. 382,974. French specification No. 605,875 describes a process of varying the filter distance by the insertion of negative or positive lenses.

By the process described in German specification No. 528,634, in which the original film and the copy'ag film both have their lenticular elements facing the source of light, copies are produced with any position of the virtual image of the filter by shifting the part of the optical system which is opposite to the positive film. In our co-pending application Ser. No. 713,186, filed Feb. 27, 1934, there is given a series of means for obtaining copies with different filter distances in contact copying.

In copying component color pictures from lenticular films it is also necessary to vary, according to the different focal lengths used in the original exposure, the devices by which the individual component pictures are copied in the correct color; see, for example, the processes described in application Ser. No. 450,238, filed May 6, 1930, and matured into Patent No. 1,874,529 and the co-pending application Ser. No. 16,902, filed April 17, 1935, by Heymer, one of the inventors of the present application.

The present invention provides a process for printing photographically from a lenticular film comprising portions having different filter distances and filter sizes, wherein means are provided whereby when in the course of the printing operation a portion of the film comes to be printed which has a filter distance or a filter size different from that of the preceding portion, there is produced automatically an alteration in the arrangement of the optical printing system which compensates for the change in the filter distance or the filter size; that is to say, in printing on to another lenticular film this alteration is such that the prints made from the said different portions of the original have all the same filter distance and filter size, and in printing on to a smooth film it is such that each different portion of the original is illuminated in the manner required for correct copying of the color values. For this purpose the film to be copied carries marks which differ from each other on portions having different filter distances or filter sizes and serve for selecting in the copying process the means appropriate to the filter distance and the filter size of the particular portion which is being copied. These marks may be arranged in various ways on the film; for example, the film may carry suitable notches or marks which are electrical conductors or not, so that they close or open an electric circuit by co-operation with a stationary contact. Alternatively, the marks may have differently impressed forms so that they can be scanned by a photoelectric device and may thus control the alteration in the arrangement of the optical printing system. With the aid of the contacts controlled by the film, it is possible, when the masses to be moved are not very great, to shift electrically, or even directly mechanically, the position of the copying apparatus to suit the new optical conditions of exposure. If desired, the necessary marks may be carried by a separate strip of film.

The accompanying diagrams illustrate the invention:

A lenticular film to be copied has been exposed with lens systems of three different focal lengths, for example 40, 50 and 80 mm. The virtual filter distance in these three exposures amounts, respectively, to 60, 80 and 120 mm. From this film the three component pictures for red, green and blue are copied by the process described in the above copending application Ser. No. 16,902, L (Fig. 1) being the source of light and $O_1$ the lenticular film. Between these are the three diaphragms $B_1$, $B_2$, $B_3$ at the respective distances 60, 80 and 120 mm. Each diaphragm has a suitable opening as shown in Fig. 2. Fig. 3 is a diagram of the electrical device by means of which the diaphragms are put into and out of position. The diaphragms $B_1$, $B_2$, $B_3$ are carried by pivoted levers which can be actuated by electromagnets $Sp_1$, $Sp_2$, $Sp_3$. The selection of the particular magnet is by means of a metal contact carried by the film $O_1$ and passing through the contact box K.

Fig. 4 shows an arrangement in a printing machine for printing according to projection printing in which the lenticular elements of the original film and the printing film face each other. In this arrangement $O_1$ is the original film, L is the printing film and A is the objective by which the original is projected on the printing film. In this process the plane determined by the narrowest section of the beam of light, in general the pupil of emergence is that in which the multi-color filter is to be arranged for projecting the print. Therefore, according to this invention care must be taken that the originals which have been taken with different distances of the exposure filter from the film in accordance with the different focal lengths of the taking objective, shall all be adapted to this distance of the projection filter from the film. This is realized in the following manner: The light rays passing through points in the filter images behind each lenticular element which correspond with the same point of the filter (for instance, through the middle point of each filter image) must intersect in a point in that plane in which in taking the original the multi-color filter was placed. This point of intersection varies in conformity with the distance of the filter image from the film in exposure, for instance, this distance may be 60, 80 or 120 millimeters for pictures taken with objectives of the three different focal lengths 40, 50 and 80 millimeters. By the intercalation of negative lenses or positive lenses the point of intersection of these rays is projected to that place at which the image of the picture of the projection filter shall be positioned when viewed from the print. This is realized by arranging frame R provided with three apertures N, S and P in which there are inserted lenses of suitable focal lengths before the original. For instance, a negative lens is inserted in N and is introduced into the beam of light for printing those parts of the film which have been taken with a focal of 40 millimeters. By these means the point of intersection of the rays coordinate with a picture point are shifted forward; in S there is arranged a plane parallel glass plate because the filter distance of the taking objective of 50 millimeters focal length corresponds with the position of the diaphragm in the printing objective A; P is a convex lens which is intended for printing that part of the film which has been taken with the objective of 80 millimeters focal length; it produces an earlier convergence of the light rays which otherwise would converge too late. The frame provided with the compensating lenses is shown in Fig. 5. Z is a piece of a magnetizable material which may be attracted by the solenoids P' and N' according to which of the lenses N or P it is desired to introduce into the beam of light before the picture gate through which the original is advanced. When neither of the solenoids is excited the plane parallel glass plate occupies the position in front of the picture gate.

In Fig. 6 there is shown an arrangement for utilizing the invention in printing according to the method and with the apparatus described in U. S. Patent 1,915,418 with the illuminating device described and shown in the co-pending application Ser. No. 634,073, filed Sept. 20, 1932, by Heymer, one of the inventors of the present application. $O_1$ is again the original film arranged in the film gate B and illuminated from the side of the lenticular elements by one of three incandescent lamps $C_1$, $C_2$ and $C_3$, each having a number of wire coils equal to the number of color areas of the multi-color filter and arranged stepwise. The wire coils of each lamp are situated at distances from the original which correspond with the apparent distances of the filter in exposure, that is to say, at $C_1$, $C_2$ and $C_3$ in conformity with the focal lengths of 40, 50 and 80 millimeters used in taking.

In printing, that lamp is illuminated whose distance corresponds with the apparent taking filter distance of the particular portion of the film which is being printed. In close proximity to the picture gate are arranged lenses $L_1$, $L_2$ and $L_3$ whose focal lengths are so related to the distances of the lamps $C_1$, $C_2$ and $C_3$ from the original that by introducing the appropriate lens into the beam of light an image of that lamp which is at the time illuminated is projected in the same plane E. The required lens may be introduced by means of the device shown in Fig. 5.

In Fig. 7 there is shown an arrangement whereby a bi-pack of a lenticular film and a smooth film as described in U. S. Patent No. 1,968,944 may be printed in accordance with the invention while using the method and apparatus described in the co-pending application Ser. No. 16,902, filed April 17, 1935, by Heymer, one of the inventors of the present application. B is the picture gate of a printing machine of the usual type. $O_1$ is the lenticular front film and $O_2$ is the smooth rear film of the bi-pack; between both there is arranged the printing film having a support coated in accordance with the co-pending application Ser. No. 646,703, filed Dec. 10, 1932, by Heymer, one of the inventors of the present application, on the side facing the lenticular original with a yellow dyed layer and a purple dyed layer arranged in superposition, and on the other side with a layer dyed bluish green. L is a source of light of longitudinal extension, for instance a Linolite lamp arranged at a distance from the picture gate greater than any occurring apparent filter distance and having a length greater than any occurring filter breadth. The source of light is preferably arranged at a distance of 40 cm. and has preferably a length of 20 cm. $A_1$, $A_2$ and $A_3$ are axles rotatably mounted at distances from the film equal to the distances of the filter from the picture gate or film in exposure and carrying frames $R_1$, $R_2$ and $R_3$ which as shown in Fig. 8 can be introduced into or removed from the trace of the rays and are normally held in their inoperative positions by springs T. When, however, owing to marks on the film the closing of an electric current excites one of the magnets $M_1$, $M_2$ or $M_3$ a corresponding piece of magnetizable material $E_1$, $E_2$ or $E_3$ is attracted and thereby the corresponding frame is introduced into the path of the light rays. Each frame contains three windows provided with filters of the required color; the size of the frames, their distance from the picture gate and their breadth corresponds exactly with the corresponding values of the exposure filter or its virtual image. At the place at which was arranged the purple filter in exposure there is used in printing a red filter, while the yellow filter in exposure is replaced in projection by a blue filter. The smooth film $O_2$ of the bi-pack is printed on the bluish-green layer of the printing film by means of the source of light G.

In the arrangement shown in Fig. 8 the action of the magnets $M_1$, $M_2$ and $M_3$ is controlled by the co-operation of marks on the original film with a photo-electrical device. C is a source of light which is projected on the film at the place occupied by the marks by means of a condenser W. The marks whose forms correspond with the focal lengths with which the corresponding parts of the film are taken transmit light which is received by a photo-electric cell H. The magnets are excited by means of the current produced in the photo-electric cell, if required after amplification by the amplifier V, or by means of a second circuit which is actuated by the said current.

Figs. 9, 10 and 11 show a device for changing the filter distance in accordance with the invention.

Fig. 9 shows a film O provided with an incision or mark $Q_1$ corresponding with the change from a part carrying a picture record taken with a specific focal length to a part carrying a picture record taken with another focal length. The border of the film is scanned by a roller R mounted on one end of a lever H rotatable about a pivot D (see Fig. 10). The other end of the lever H prevents rotation of the gear wheel Z in the direction of the arrow as long as the roller glides on the border of the film. As soon as the roller glides over an incision A the lever is raised and the gear wheel Z is advanced by one tooth. On the same axle as Z there is mounted a drum T with which moves a band of a non-conductive material having cut-outs S. On this band slide springs G, each of which is connected with the circuit of a magnet for inserting the required mask into the trace of the rays of the printing machine. By the cut-outs S the required spring is brought into contact with the metallic surface of the drum whereby the circuit for actuating the magnets is closed.

Fig. 12 shows a film provided with marks $Q_2$ for controlling the filter distance according to this invention with use of a photo-electric device as shown in Fig. 8. If on the original the space provided for the sound track is not used the marks may be applied to this place (the sound record may be taken on a separate film). When three magnets are to be actuated the whole breadth of the space may be blackened, or two thirds may be blackened or only one third may be blackened each zone of blackening being coordinated to a different focal length. The different impulses of current obtained by the different quantities of light transmitted by the differently blackened spaces serve to control the magnets.

What we claim is:

1. An apparatus for printing photographically from a lenticular film comprising portions which have been taken with different focal lengths and having marks at the passages from one such portion to another which comprises means for holding a lenticular film in printing relation, a known printing system comprising a diaphragm arranged in correct optical position to said lenticular film and optical means for correcting the position of said diaphragm for the different focal lengths of the different film portions, and means for automatically working said optical means for correcting the optical position of said diaphragm in accordance with said control marks.

2. An apparatus for printing photographically from a lenticular film comprising portions which have been taken with different focal lengths and having marks at the passages from one such portion to another which comprises means for holding a lenticular film and a printing film in printing relation, a known printing system comprising a diaphragm arranged in correct optical position to said lenticular film and means for correcting the position of said diaphragm for the different focal lengths of the different film portions, and means for automatically working said means for correcting the position of said diaphragm in accordance with said control marks.

3. An apparatus for printing photographically from a lenticular film comprising portions which have been taken with different focal lengths and having marks at the passages from one such portion to another which comprises means for holding a lenticular film in printing relation, a known printing system comprising an elongated source of light, a number of multi-color filters arranged at different distances from the source of light between said source of light and said lenticular film and means for interposing one of said filters in the path of the rays proceeding from said light source to said lenticular film, and means for automatically working said means for interposing any one of said multi-color filters in accordance with said control marks.

4. An apparatus for printing photographically from a lenticular film comprising portions which have been taken with objectives of different focal lengths which film carries control marks at the points where changes in focal length of objective occur comprising means for holding said lenticular film and a printing film in printing relation, a copying optic, compensating means for the different focal lengths in different film portions and means actuatable by the said control marks for operating said compensating means to insert the correct compensating agent into the copying optic.

JOHN EGGERT.
GERD HEYMER.